United States Patent [19]

Shimamoto et al.

[11] Patent Number: 6,007,738
[45] Date of Patent: Dec. 28, 1999

[54] SELECTIVELY REFLECTIVE POLYMER MOULDED ARTICLE AND A PROCESS FOR PRODUCING THE SAME

[75] Inventors: Shu Shimamoto, Himeji, Japan; Derek Geoffrey Gray, Montreal West, Canada

[73] Assignee: Daicel Chemical Industries, Ltd., Osaka, Japan

[21] Appl. No.: 08/982,258

[22] Filed: Dec. 1, 1997

[51] Int. Cl.$^6$ .................................................... C09K 19/38
[52] U.S. Cl. .......................... 252/299.01; 428/1; 349/183
[58] Field of Search .............................. 252/299.01, 582; 428/1; 349/183

[56] References Cited

FOREIGN PATENT DOCUMENTS

| 0799877A1 | 10/1997 | European Pat. Off. . |
| 19544091C1 | 4/1997 | Germany . |
| 9183801 | 7/1997 | Japan . |
| WO 9521901 | 8/1995 | WIPO . |

OTHER PUBLICATIONS

Jacobs, *Journal of Fusion Energy*, vol. 5, No. 1,:65–75 (1986).
Charlet et al., *Macromolecules* vol. 20:333–38 (1987).
Suto et al., *Journal of Applied Polymer Science*, vol. 61:1621–1630 (1996).
Watanabe et al., *Polymer Journal*, vol. 9, No. 3:337–340 (1977).
Suto et al., *Journal of Applied Polymer Science*, vol. 61, pp.,1621–1630 (XP002062785) (1996).
Charlet et al., *Macromolecules*, vol. 20, No. 1 pp.33–38 (XP002062786) (1987).
Harkness et al., *Macromolecules*, vol. 24, No. 8, pp.1800–1805 (XP002062788) (1988).
Ritcey et al., *Macromolecules*, vol 21, No. 5, pp. 1251–1255 (XP002062788) (1988).
Muller et al. *Advanced Materials*, vol. 9, No. 2, pp. 159–162 (XP000681088) Feb. 1997).

*Primary Examiner*—Shean C. Wu
*Attorney, Agent, or Firm*—Birch, Stewart, Kolasch & Birch, LLP

[57] ABSTRACT

This invention provides, in an easy manner, a film-like moulded article which shows a selective reflection of a wavelength and circularly polarized light. A suitable environment for formation of a liquid crystalline phase is prepared by forming a moulded article (thin film-like moulded article) using a cellulose derivative which can form the liquid crystalline phase (e.g. a water-insoluble cellulose derivative such as ethyl cellulose), and allowing the moulded article to absorb a highly volatile organic solvent by contact with its vapour. After formation of the liquid crystalline phase, removal of the organic solvent provides the object moulded article. The thin film-like moulded article can be employed for an optical element of a circular polarized light-generator or a decoration material.

20 Claims, 1 Drawing Sheet

SELECTIVELY REFLECTIVE POLYMER MOULDED ARTICLE AND A PROCESS FOR PRODUCING THE SAME

FIELD OF THE INVENTION

The present invention relates to a film and other moulded articles which have a reflection selectivity with respect to wavelength and circularly polarized light and which are useful for optical systems of a circularly polarized light-generator or for decorative materials, and a process for producing the same.

BACKGROUND OF THE INVENTION

It has been known that cellulose derivatives inclusive of hydroxypropyl cellulose (HPC) and cellulose triphenylcarbamate form a chiral nematic (cholesteric) liquid crystalline phase by being dissolved in a proper solvent under appropriate conditions, e.g. temperature, concentration. The chiral nematic liquid crystalline phase has a structure where sheet-like nematic liquid crystal phases are piled helicoidally, with each rotating in the direction of orientation. The chiral nematic liquid crystalline phase shows a specific optical properties: the phase selectively reflects circularly-polarized light which corresponds to the orientation direction of a sheet-like nematic liquid crystal. In this selective reflection, the chiral nematic liquid crystal reflects, at the maximum, the wavelength which corresponds to the product of the cycle (pitch) at which the orientation of the sheet-like nematic liquid crystal rotates in 360 degrees and the average refraction index of the liquid crystal phase. It is reported in detail, for example, that such a selective reflection of the chiral nematic liquid crystal is useful for laser systems as a part of a circularly polarized light-generator [see, for instance, Jacobs, Journal of Fusion Energy, 5(1), 65–75 (1986)]. If the wavelength of the selective reflction by the chiral nematic liquid crystal lies within a visible light region, the chiral nematic liquid crystal develops a beautiful colour, thus being useful for applications as decorative materials.

However, formation of the chiral nematic liquid crystal is strictly governed by the conditions such as temperature and concentration. Besides, the chiral nematic liquid crystal has to be enclosed or sealed between glass plates in a liquid state. For these reasons and others, the chiral nematic liquid crystal has limited applications and scarcely used on an industrial basis.

To find a solution to this problem, attempts have been made to give a solid structure to the chiral nematic liquid crystalline phase by solidifying a polymer solution containing the chiral nematic crystalline phase. Charlet and Gray prepared a film which selectively reflects right-circularly polarized light by removing water from an HPC aqueous solution [Macro-molecules, 20, 33–38 (1987)]. However, its reflection intensity is about 0.8 to 1.5 relative to 20 to 30 $\mu$m film thickness, in terms of the absolute value of ellipticity of the circular dichroism spectrum as the index. Such a reflection intensity is unsatisfactory in practice. Besides, since HPC is soluble in water, its applications or the manner of its use is limited.

Charlet and Gray reported three process for a film preparation which shows a selectivity in reflection: (i) a method comprising removing a solvent from an isotropic solution of hydroxypropyl cellulose; (ii) a method which comprises putting a liquid crystal solution of hydroxypropyl cellulose between glass plates, forming a liquid crystal phase by sliding or shifting one of the glass plates, keeping the phase under its own vapour pressure for a few minutes to eliminate the orientation by shearing, and thereafter removing the solvent; and (iii) a method which comprises putting the HPC solution between porous materials and removing the solvent.

Nevertheless, the above methods cannot provide a solid film which has reflection selectivity, in the case of the chiral nematic liquid crystal system composed of a number of cellulose derivatives (e.g. halogenated hydrocarbon solutions of ethylcellulose, phenol solutions, or organic acid solutions). This is presumably because of imperfect formation of liquid crystal structure, deviation of the wavelength of the selective reflection from a visible light region, or deformation of the liquid crystal structure due to the shearing forced generated during preparation. Although this report mentions that the pitch of the liquid crystalline phase in the solid product depends on the drying rate of the solvent, no methods are suggested for preparation of a selectively reflective film. As a matter of fact, it is very rare, even counting the report of Charlet et al., that a film with reflection selectivity is prepared from cellulose derivatives by a so-called casting method, i.e., a method of removing a solvent from a polymer solution. In general, it is very hard to achieve a successful preparation of a reflection-selective film by the casting method.

Suto et al. prepared a film which shows positive circular dichroism at 200 to 300 nm by thermal compression moulding ethyl cellulose with degree of substitution (DS) of 2.67, or by removing a solvent from an m-cresol solution of the ethyl cellulose in a normal laboratory atmosphere [J. Appl. Polym. Sci., 61, 1621 (1996)]. However, the product has a short wavelength of the selective reflection, exhibiting no selective reflection in a visible light region. Suto et al. do not state any method for controlling the wavelength of the selective reflection of the products. Further, the selective reflection intensity is unclear, as they fail to indicate the unit of the circular dichroism spectrum.

Watanabe et al. prepared a film which selectively reflects left-circularly polarized light by the casting method from a polyglutamic acid derivative which forms the chiral nematic liquid crystal [Polymer Journal, 9(3), 337–440(1977)]. The intensity of the selective reflection is unknown because of a lack of quantitive descriptions. It should be borne in mind that the polymer (polyglutamic acid derivative) is either hard to obtain or expensive. This literature mentions the influence of a solvent or a solvent mixture on the wavelength of selective reflection of a film. Nevertheless, no methods are disclosed as to the preparation of a selectively reflective film.

PROBLEMS TO BE SOLVED BY THE INVENTION

It is, therefore, an object of the present invention to provide a moulded article (in particular, a film and other thin film-like moulded articles) which reflects circularly polarized light selectively at certain wavelengths, and a method of producing the same.

It is another object of the present invention to provide a highly selectively reflective film or moulded article, which is water-resistant and obtainable at a relatively low cost.

It is yet another object of the present invention to provide a selectively reflective moulded article which is useful for a part of a circular polarized light-generator or a decoration material, and a process for producing the same.

It is a further object of the present invention to provide a process for efficiently producing the above selectively reflective moulded article.

A still further object of the present invention is to provide a process for forming, in an easy and simple manner, a covering layer which has a selectivity in reflection with respect to a wavelength and circularly polarized light.

MEANS TO SOLVE THE PROBLEMS

The pitch of the chiral nematic phase is somewhat dependent on a polymer/solvent system. For example, ethyl cellulose with DS of 2.5 in chloroform possesses pitches of 250 to 450 nm at concentrations of 44 to 48% by weight. In this pitch range, the selective reflection of the visible light component takes place. Based on this information, the inventors of the present invention have made intensive efforts and found that a shaped or moulded article which has an equal pitch as the wavelength of visible light and selectively reflects a part of the visible light component can be prepared by relatively swift removal of a solvent from a liquid crystal solution with a slightly lower concentration (e.g. lower by 5 to 30% by weight) than that causing the selective reflection (i.e. a liquid crystal solution which has a longer pitch than the wavelength of visible light).

The moulded article of the present invention includes (a) a shaped or moulded article which comprises a liquid crystalline polymer (a cellulose derivative, etc.), has the selective reflection maximum in a visible light region towards circularly polarized light, and has the absolute value of the apparent circular dichroism of not less than 2,000 millidegree due to the selective reflection; and (b) a shaped or moulded article which comprises a water-resistant cellulose derivative, has the reflection maximum in a wavelength range of 300 nm or longer, and selectively reflects substantially right- or left-circularly polarized light. The shaped or moulded article includes a film and other thin film-like moulded articles. Cellulose ether or its derivative can be used as the cellulose derivative.

The process of the present invention provides a selectively reflective moulded article by contacting a moulded article, which is composed of a polymer capable of forming a liquid crystalline phase, with a vapour of a solvent to form a liquid crystalline phase, and by removing the solvent.

In the solvent removal step of this invention, we take advantage of the phenomenon in which the change in the pitch of the chiral nematic liquid crystalline phase cannot follow the change in the concentration. Thus, the concentration of the liquid crystal solution plays an important role in the present invention. Generally, the longer the pitch of the liquid crystal solution used in moulding is, the longer wavelength of the selective reflection the resulting moulded article will obtain.

DETAILED DESCRIPTION OF THE INVENTION

[Selectively reflective moulded article]

As far as being formable of a chiral nematic liquid crystalline phase, the moulded article of the present invention can be composed of various liquid crystalline polymers (e.g. liquid crystalline polyester, polybenzyl-L-glutamate), particularly, cellulose derivatives. The cellulose derivative may be soluble in water, but may practically be insoluble in water. As the cellulose derivatives, there may be mentioned cellulose ethers including an alkyl cellulose (e.g. a $C_{1-4}$ alkyl cellulose such as methyl cellulose and ethyl cellulose, an aralkyl cellulose such as benzyl cellulose, phenetyl cellulose and trityl cellulose), a hydroxyalkyl cellulose (e.g. a hydroxy-$Ci_{-4}$ alkyl cellulose such as hydroxyethyl cellulose and hydroxypropyl cellulose), a carboxyalkyl cellulose (e.g. carboxymethyl cellulose), a hydroxyalkyl alkyl cellulose (e.g. a hydroxy-$C_{1-4}$ alkyl $C_{1-4}$ alkyl cellulose such as hydroxyethyl methyl cellulose, hydroxyethyl ethyl cellulose, hydroxypropyl methyl cellulose and hydroxypropyl ethyl cellulose), a cyanoalkyl cellulose (e.g. cyanoethyl cellulose), derivatives which have a skeleton of these cellulose ethers, cellulose esters (e.g. cellulose acetate, cellulose acetate propionate, cellulose acetate butylate), cellulose triphenylcarbamate, etc. The derivatives with a cellulose-ether skeleton include a cellulose ether ester derivative esterified with an acid (e.g. a $C_{2-5}$ organic acid ester such as acetic acid, propionic acid and butyric acid, a mixture of these organic acids, an inorganic acid such as sulfuric acid and nitric acid). A $C_{2-5}$ organic acid ester such as acetic acid or its anhydride for cellulose acetate may practically used as the organic ester.

These cellulose derivatives can be used alone or in combination.

Preferable cellulose derivatives include cellulose ether and its derivative (particularly, ethyl cellulose and a derivative of ethyl cellulose).

The average substitution degree of the cellulose derivative is not specifically restricted so far as not deteriorating the liquid crystal property and operability. With regard to the cellulose ethers (ethyl celluloses, etc.), the average degree of substitution (DS) can be selected from a range of about 1 to 3. Practically, the average DS may be about 2.0 to 3.0 (e.g. 2.2 to 3.0), where the cellulose derivative is soluble in an organic solvent but insoluble in water. It may preferably be about 2.3 to 2.9 (e.g. 2.3 to 2.8), and more preferably about 2.3 to 2.7. With too low an average DS, it is difficult to prepare a liquid crystal solution which has a pitch equivalent to or higher than the visible wavelength and to give selective reflection property to a shaped or moulded article. On the other hand, it is uneconomical to use a cellulose derivative which has an excessive average DS. In economical point of view, a cellulose derivative with an average degree of substitution of 2.7 or less is desirable.

The rotation direction (rotating direction) of the nematic liquid crystalline sheet in the chiral nematic liquid crystalline phase is related to the DS of the cellulose derivative. Taking the case of ethyl cellulose as an example, the sheet rotates to the right with DS of about 3.0, and to the left with DS of about 2.5, the former sheet selectively reflecting right-circularly polarized light, while the latter sheet reflecting left-circularly polarized light (D. R. Budgell, Ph D thesis McGill University, 1989). Therefore, when a selectively reflective moulded article of the present invention is employed as a part of a circular polarized light-generator, DS of the cellulose derivative is selected according to a desired direction of the circularly polarized light.

In the derivative with a cellulose ether skeleton, the average DS of the ester can be selected, according to the degree of esterification, from a range of about 0.01 to 1.5, usually, about 0.1 to 0.5.

If the cellulose derivative is ethyl cellulose, the content of the ethoxyl group is, for example, about 30 to 55% and preferably about 43 to 55%.

The average degree of polymerization (DP) (or, molecular weight or solution viscosity) of the cellulose derivative (e.g. ethyl cellulose) is selected from a range of, for example, about 50 to 1,500, preferably about 100 to 1,200, and more preferably about 200 to 1,000, in terms of weight average degree of polymerization. Among the cellulose derivatives, the solution viscosity of ethyl cellulose is about 10 to 300 cP, preferably about 15 to 250 cP and more preferably about 20 to 200 cP, measured at 25° C. at a concentration of 5% by weight using a mixed solvent of toluene/ethanol (8/2, by volume).

As described above, the process of the present invention makes use of the phenomenon where the change. of the pitch of the chiral nematic liquid crystalline phase cannot accompany the change of the concentration of the liquid crystalline polymer during the solvent removal step. It is, therefore, preferable for the cellulose derivative to have a high average DP. By way of example, as the DP of ethyl cellulose decreases, the pitch of the liquid crystalline phase of the moulded article gets shorter. For this reason, as to ethyl cellulose with an average DS of about 2.5, if the solution containing 5% by weight of ethyl cellulose in a mixed solvent of toluene/ethanol (8/2, by volume) has a lower polymerization degree and a viscosity of 4 cP or less, the moulded article tends to obtain too short a wavelength of the selective reflection. Under such conditions, it is difficult to provide a moulded article of the present invention.

The moulded article comprising the cellulose derivative selectively shows the reflection maximum towards circularly polarized light in a wavelength range of 300 nm or longer, in particular, in a visible wavelength region (wavelength of about 400 to 700 nm). Namely, the moulded article selectively reflects substantially right- or left-circularly polarized light. As a result, the moulded article presents a beautiful colour in response to the reflected visible wavelength.

In addition, the moulded article of the present invention has an absolute value of the apparent circular dichroism due to the selective reflection of not lower than 2,000 millidegree (preferably not lower than 2,500 millidegree, and more preferably not lower than about 3,000 millidegree).

The shape of the moulded article is not particularly limited. Although the moulded article may have a three-dimensional structure, it generally has a two-dimensional structure as represented by a thin film or membrane (in particular, a film, a sheet, etc.). The moulded article may be entirely composed of the cellulose derivative, or may be provided, at least on its surface, with a selective reflection layer of the cellulose derivative. The thickness of the thin film or membrane and the selective reflection layer may be, for example, about 5 to 300 $\mu$m, preferably about 5 to 200 $\mu$m, and more preferably about 5 to 100 $\mu$m, practically being about 5 to 70 $\mu$m.

[Production process]

The process of the present invention comprises the step of forming a liquid crystalline phase (mesophase) by contacting a moulded article (particularly, a thin film or a film-like moulded article) composed of a polymer which can form the liquid crystalline phase, with a vapour of a solvent, and the step of removing the solvent from the moulded article after formation of the liquid crystalline phase. By going through these steps, a selectively reflective moulded article can be produced with efficiency. The moulded article may be either of (i) a moulded article formed on a base or support by coating a solution containing a liquid crystalline phase-formable polymer and a solvent, or (ii) a moulded article free from a base. The moulded article may be in an undried or semi-dried state, or in a solid dry state.

As the polymer which can form the liquid crystalline phase in the above processes, use can be made of various liquid crystalline polymers (e.g. liquid crystalline polyester), in particular, a cellulose derivative which can form the liquid crystalline phase.

The above process (1) comprises the following steps:

(i) the step of coating a base with an organic solvent solution of a liquid crystalline polymer and, where necessary, drying the layer thus coated;

(ii) the step of forming a liquid crystalline phase by exposing the coating layer to a vapour of the solvent at constant conditions (temperature, vapour pressure), thereby eliminating the effect of the molecular orientation in the liquid crystalline phase due to shearing force generated by the coating, and forming a higher order structure which possesses an uniformity in pitch and orientation in the chiral nematic liquid crystal; and (iii) the step of removing the solvent after the step of liquid crystalline phase formation.

When a dry moulded article (in particular, a thin film-like moulded article) is to be put through the step of liquid crystalline phase formation in the above processes (1) and (2), a coating composition containing an organic solvent is used for formation of the thin film-like moulded article. The species of the organic solvent is not specifically restricted, and liberally selected depending on the species of the liquid crystalline polymer inclusive of the cellulose derivative. For instance, the organic solvent can be selected from hydrocarbons (e.g. aliphatic hydrocarbons such as heptane, hexane and octane, alicyclic hydrocarbons such as cyclohexane, aromatic hydrocarbons such as toluene and xylene), halogenated hydrocarbons (e.g. dichloromethane, dichloroethane, chloroform), alcohols (e.g. methanol, ethanol, propanol, isopropanol, butanol, tbutanol), esters (e.g. methyl acetate, ethyl acetate, butyl acetate), ethers (e.g. dioxane, diethyl ether, diisopropyl ether, dimethoxyethane, tetrahydrofuran), ketones (e.g. acetone, methyl ethyl ketone, methyl isobutyl ketone), cellosolves, carbitols, nitriles (e.g. acetonitrile), and mixtures of these solvents.

According to the present invention, the moulded article which not only has a pitch equivalent to the visible wavelength but also selectively reflects a part of the visible light component by removing the solvent from the liquid crystal solution in a relatively prompt manner (or at a relatively fast rate), wherein the liquid crystal solution has a slightly lower concentration than that required for the selective reflection of visible light (i.e. the liquid crystalline solution has a wider pitch than the visible wavelength). Such a moulded article is successfully prepared owing to the fact that the change of the pitch of the chiral nematic liquid crystalline phase fails to follow the change of the concentration of the liquid crystalline polymer solution in the course of the solvent removal step. For a faster removal of the solvent, it is desirable to use a highly volatile solvent to be named below.

The concentration of the liquid crystalline polymer is selected from a range where the liquid crystalline phase can be formed in the liquid crystalline polymer/solvent system, in particular, from the concentrations slightly lower than those causing the selective reflection of visible light. For instance, the concentration of the liquid crystalline polymer, selected according to the species of the liquid crystalline polymer and the solvent, is about 15 to 75% by weight, preferably about 20 to 60% by weight, and more preferably about 25 to 50% by weight. The cellulose derivative is usually used in the form of a concentrated solution (e.g. about 30 to 60% by weight, preferably about 30 to 50% by weight).

As the base, a base which has an appropriate surface such as a plane or curved surface (preferably, a flat or smooth surface) can be used depending to its intended uses, its species not being specifically limited. Examples of its material are plastics, ceramics (glass, etc.), metals and so on.

The coating composition can be coated onto the base in a conventional manner, such as roll coating, reverse coating, gravure coating, spray coating, dipping, spin coating, etc. After the coating, the layer thus coated may be put through the solvent removal step or the drying step, if necessary. The coating layer (thin film-like moulded article) may contain an organic solvent. Incidentally, use of a liquid crystalline polymer with a relatively high viscosity may sometimes interfere the production of a film-like moulded article with a smooth surface. In such a case, a uniform thin film (film-like moulded article) of the liquid crystalline solution can be formed on the base by coating the smooth surface with a solution having a comparatively low viscosity, and thereafter controlling the concentration to a desired rate for liquid crystal formation in the solvent removal step.

When the coating layer contains an organic solvent and is in an undried or semi-dried state, it is important to keep the concentrations of the liquid crystalline polymer and the solvent in the coating layer at an almost constant value during the step of liquid crystalline phase formation which follows the coating step. Unless eliminating the molecular orientation in the liquid crystalline phase caused by shearing, use of a liquid crystalline polymer of a proper composition fails to ensure the production of the moulded article which shows a good selective reflection of circularly polarized light in the visible light component. During the step of liquid crystalline phase formation, the solvent concentration in the coating layer can be kept at a suitable value for the formation by exposing the coating layer to the vapour atmosphere of the solvent and keeping it standing for a while, as in the step of liquid crystalline phase formation of the process (2). To be more specific, the atmosphere for liquid crystalline phase formation is obtained, by means of a vapour pressure of a solvent, by allowing the coating layer to coexist in a sealed container with a solution containing the liquid crystalline polymer and the organic solvent.

The period for such stationary exposure required for the formation of the liquid crystalline phase is selected according to the DP of the polymer, and the polymer/solvent system. At ambient or room temperature (e.g. 10 to 40° C., preferably 15 to 30° C.), the period may practically be not shorter than one hour (particularly, about several hours to some days). The diffracted wavelength varies according to the change of the pitch in the chiral nematic liquid crystalline phase. Therefore, formation of the liquid crystalline phase can be visually observed by the change in the colour of the coating layer (thin film-like moulded article) at an angle of diffraction of about 60°(2Θ).

In the solvent removal step, any method which enables swift or prompt removal can be applied. By way of illustration, the solvent can be removed by airdrying or heating. If the solvent is highly volatile, it can be efficiently removed simply by leaving the moulded article in an environment of about 10 to 100° C. (preferably, about 20 to 70° C., in particular, about 20 to 50° C.). To retain a higher order structure of the liquid crystalline phase, the moulded article may be left in an open system at ambient temperature of about 10 to 40° C.

The process (2) comprises the step of allowing an article (e.g. a film-like article) which is capable of forming a liquid crystalline phase to contact the vapour of a solvent to form the liquid crystalline phase, and the step of removing the solvent from the article (e.g. a thin film) after the liquid crystalline phase is formed in the previous step.

In the step of liquid crystalline phase formation of the process (2), it is effective to leave a thin film composed of a polymer in an atmosphere of a solvent which is highly volatile and is a good solvent for the liquid crystalline polymer, whereby the liquid crystalline phase is formed with equilibrating the vapour pressure between the moulded article and the atmosphere. To be specific, the solvent is absorbed in the moulded article (particularly, a thin film) through contact of the moulded article (particularly, a thin film) with the solvent vapour, and the moulded article is thus brought into a liquid crystal state. A higher order structure of the chiral nematic liquid crystal is formed by keeping the concentration at a desired value. Thus, the moulded article (thin film, in particular) can be prepared with using a proper solvent solution by a conventional method such as casting method, the moulding process not being particularly restricted.

In the liquid crystal phase formation step, it is desirable to use a highly volatile solvent and equilibrate the solvent vapour pressure of the moulded article (e.g. thin film-like moulded article) with that of the atmosphere, which results in prompt removal of the solvent from the moulded article. The highly volatile solvents include an organic solvent with a boiling point of not higher than 100° C. (e.g. boiling point of about 20 to 80° C., preferably about 30 to 70° C.), examples of which are hydrocarbons (e.g. heptane, hexane, cyclohexane, benzene), halogenated hydrocarbons (e.g. dichloromethane, chloroform, dichloroethane, fluorobenzene), alcohols (e.g. methanol, ethanol, propanol, 2-propanol, t-butanol), ketones (e.g. acetone), esters (e.g. methyl acetate, ethyl acetate), ethers (e.g. diethyl ether, isopropyl ether, dimethoxyethane, tetrahydrofuran), nitriles (e.g. acetonitrile), and so on. These solvents can be used singly or as a mixture of two or more species. Use of a solvent with a low volatility not only consumes much time for complete removal of the solvent from the moulded article, but also makes it difficult to produce the moulded article which shows a good selectivity in reflection.

The solvent concentration in the moulded article is controlled at a suitable value for formation of the liquid crystalline phase by absorption of the solvent into the moulded article (particularly, the thin film). Such an environment with a suitable solvent concentration is obtained by a process which comprises leaving the moulded article together with the solution of the liquid crystalline polymer and the organic solvent in a closed system, thereby exposing the moulded article to the atmosphere of the solvent vapour; or a process which comprises leaving the moulded article in an atmosphere of an organic solvent vapour where the vapour pressure is suitably controlled for formation of the liquid crystalline phase, thereby exposing the moulded article to the atmosphere of the solvent vapour.

The stationary exposure for liquid crystalline phase formation and the solvent removal step are conducted in the same manner as in the above process (1).

According to these processes, the process (1) in particular, a base of an optional shape can be covered or coated by a selectively reflective moulded article. Consequently, the present invention is applicable to a number of liquid crystals in a polymer/solvent system contaning a volatile solvent. Whereas according to the process (2), in particular, use of a premoulded article (particularly, a thin film-like moulded article) provides the selectively reflective thin film in an easy manner without the step of disturbing the higher order structure of the liquid crystalline phase after its formation. Besides, the processes (1) and (2), in which the shape of the thin film can be maintained, can easily provide a smooth film-like moulded article, too.

The present invention ensures efficient production of the moulded article (thin film or film, in particular) which selectively reflects substantially right- or left-circularly polarized light by the simple steps of coating, leaving or standing (stationary exposure) or contacting, and drying.

The moulded article of the present invention (particularly, the thin film-like moulded article) is useful in wide applications which make use of selective reflection and circular polarization, and used as a part of a circular polarized light-generator (particularly, an element which constitutes the optical system), and a decoration material (e.g. a decorative film), to name a few.

EFFECTS OF THE INVENTION

According to the present invention, a film or other moulded articles which have a high reflection selectivity in a wavelength and in circularly polarized light are efficiently produced with the use of a liquid crystalline polymer such as a cellulose derivative. The moulded article not only has a high reflection-selectivity, but also is water-resistant and obtainable at a comparatively low cost. Consequently, it is useful for a part of a circular polarized light-generator and a decoration material.

Moreover, the present invention ensures efficient production of the selectively reflective moulded article by a simple method such as a casting method, further assuring an easy and efficient formation of a covering layer which has a selectivity in reflection not only towards a wavelength but also towards circularly-polarized light.

EXAMPLES

The following examples are intended to describe the present invention in further detail and should by no means be interpreted as defining the scope of the invention.

The wavelength of the selective reflection (the selectively reflected wavelength) was measured using a UV-visible spectrophotometer. The circular dichroism (ellipticity) at the maximum wavelength in selective reflection was measured up to 2,000 millidegree.

Example 1

A colourless transparent film 10 µm thick was prepared by dissolving ethyl cellulose [ethoxyl content: 48.6%; viscosity of solution containing 5% by weight of toluene/ethanol (8/2): 45 cps (at 25° C.)] in a solvent [chloroform/methanol=8/2 (by volume)] and then casting the mixture on a glass plate. The film on the glass plate was placed in a container which contains a chloroform solution containing 29.2% by weight of ethyl cellulose, and allowed to contact the vapour of the solvent for three days. After the period, the film was taken out of the container with the glass plate. Then, the solvent was removed from the film at room temperature.

The film had a thickness of 10 µm and looked green. The apparent circular dichroism spectrum is shown in FIG. 1. The positive sign of the spectrum showing the maximum (peak) at 550 nm indicates that the film selectively reflects left-circularly polarized light.

Example 2

A colourless transparent film 40 µm thick was prepared by dissolving ethyl cellulose [ethoxyl content: 48%; viscosity of solution containing 5% by weight of toluene/ethanol: 100 cps (at 25° C.)] in a solvent [chloroform/methanol=8/2 (by volume)] and then casting the mixture on a glass plate. The film on the glass plate was likewise placed in a container which contains a chloroform solution containing 36.6% by weight of the above ethyl cellulose, and allowed to contact the vapour of the solvent for 13 days. Thereafter, the film was taken out of the container with the glass plate, and the solvent was removed from the film at room temperature.

The thus obtained film had a thickness of 40 µm and looked green. The apparent circular dichroism was positive (i.e. selective in reflection towards left-circularly polarized light), and the absolute value of the circular dichroism was not lower than 2,000 millidegree. The UV-visible reflection spectra are shown in FIG. 2, which indicates the peak wavelength of the selective reflection at 540 nm.

Example 3

Ethyl cellulose [ethoxyl content: 48%; viscosity of solution containing 5% by weight of toluene/ethanol (8/2): 100 cps (at 25° C.)] was acetylated in pyridine with acetic anhydride to give an acetylated ethyl cellulose with an average substitution degree of the acetyl group of 0.4. The acetylated ethyl cellulose was dissolved in a solvent [chloroform/methanol=8/2 (by volume)], and then the mixture was cast on a glass plate to give a film with a thickness of 60 µm. The film on the glass plate was placed, as in Example 1, in a container which contains a chloroform solution containing 36% by weight of the acetylated ethyl cellulose, and allowed to contact the vapour of the solvent for two days. Then, the film was taken out of the container with the glass plate, and the solvent was removed therefrom at room temperature.

The film had a thickness of 60 µm and looked blue. The maximum wavelength of the selective reflection measured by a UV-visible reflection spectra was 400 nm. The sign of the apparent circular dichroism was negative (namely, selective in reflection towards right-circularly polarized light), the absolute value being not lower than 2,000 millidegree.

Example 4

A colourless transparent film with a thickness of 40 µm was obtained by dissolving ethyl cellulose as shown in Table 1 in a solvent [chloroform/methanol=8/2 (by volume)] and casting the resultant solution on a glass plate. The film on the glass plate was placed in a container together with the solution of the ethyl cellulose solvent (species of the solvents and the ethyl cellulose concentration were given in Table 1), thereby allowing the film to stand in contact with the solvent vapour for three days. The film, together with the glass plate, was taken out of the container, and the solvent was removed from the film at ambient temperature.

Table 1 shows the signs of the apparent circular dichroism, colours, maximum wavelengths of the selective refection of the resultant films as well as the conditions for film preparation. It should be noted that all films showed the apparent circular dichroism of not lower than 2,000 millidegree.

TABLE 1

| Ethyl Cellulose | | | Concentration | Sign of circular | | Maximum wavelength of |
|---|---|---|---|---|---|---|
| Ethoxyl content (%) | Viscosity*(cps) | Solvent | (weight percent) | dichroism spectrum | Colour | selective reflection (nm) |
| 48 | 22 | $CH_2CL_2$ | 36.9 | Positive | Green | 530 |
| 48 | 22 | $CH_2CL_2$ | 38.3 | Positive | Greenish Blue | 465 |
| 48 | 22 | $CH_2CL_2$ | 41.9 | Positive | Blue | 432 |
| 48 | 100 | $CH_2CL_2$ | 37.9 | Positive | Red | 650 |

TABLE 1-continued

| Ethyl Cellulose | | Concentration | Sign of circular | | Maximum wavelength of |
|---|---|---|---|---|---|
| Ethoxyl content (%) | Viscosity*(cps) | Solvent | (weight percent) | dichroism spectrum | Colour | selective reflection (nm) |
| 48 | 100 | $CH_2CL_2$ | 40.1 | Positive | Green | 544 |
| 48 | 100 | $CH_2CL_2$ | 42.6 | Positive | Blue | 464 |
| 48 | 100 | $CH_2CL_2$ | 44.2 | Positive | Purpish Blue | 398 |
| 48 | 100 | $CHCL_3$ | 32.7 | Positive | Red | 666 |
| 48 | 100 | $CHCL_3$ | 35.5 | Positive | Green | 541 |
| 48 | 100 | $CHCL_3$ | 38.0 | Positive | Blue | 448 |

*viscosity at a concentration of 5% by weight

Comparative Example 1

A film 40 μm thick was obtained by dissolving 1 g of ethyl celulose [ethoxyl content: 48.6%; viscosity of solution containing 5% by weight of toluene/ethanol (8/2): 45 cps (at 25° C.)] in 10 ml of a solvent [chloroform/methanol=8/2 (by volume)], and casting the solution on a glass plate. The resultant film was colourless and transparent.

Comparative Example 2

Ethyl cellulose [ethoxyl content: 48.6%; viscosity of solution containing 5% by weight of toluene/ethanol (8/2): 45 cps (at 25° C.)] was dissolved in chloroform to give liquid crystal solutions with a concentration of 35%, 40% or 45% by weight each. These liquid crystal solutions were put between glass plates, and one of the glass plate was slid slowly while the glass plates were covered with a glass petri dish. All the solutions gave colourless films.

Comparative Example 3

A liquid crystal solution with a concentration of 35% was obtained by dissolving ethyl cellulose [ethoxyl content: 48.6%; viscosity of solution containing 5% by weight of toluene/ethanol (8/2): 45 cps (at 25° C.)] in chloroform. The solution was put between 20-μm-thick polypropylene films, whereby the solvent was removed little by little from the solution. Although the colour of the film gradually changed from red, through green, to blue during the solvent drying step, the finally obtained solid film was colourless.

Figure 1:
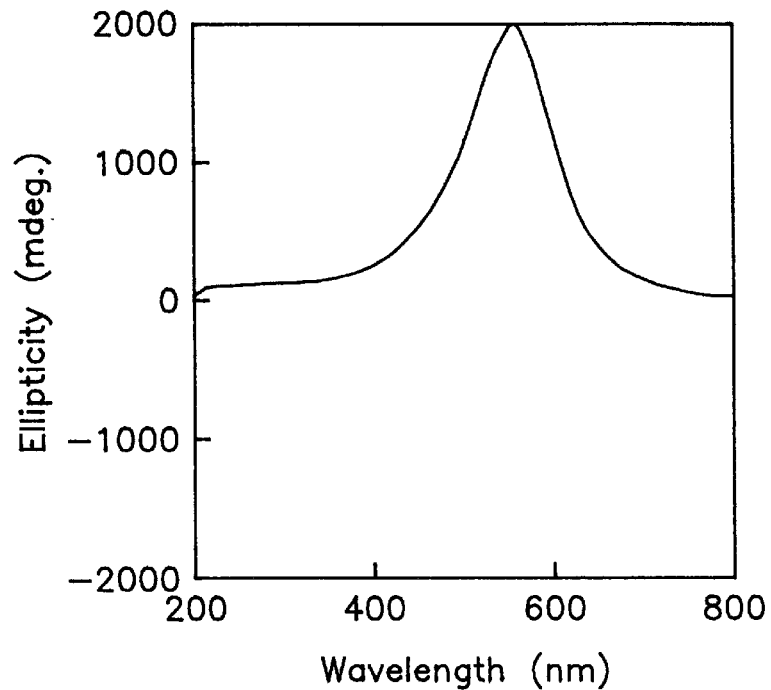
FIG. 1 shows the apparent circular dichromic spectrum of the film prepared in Example 1.
Figure 2:
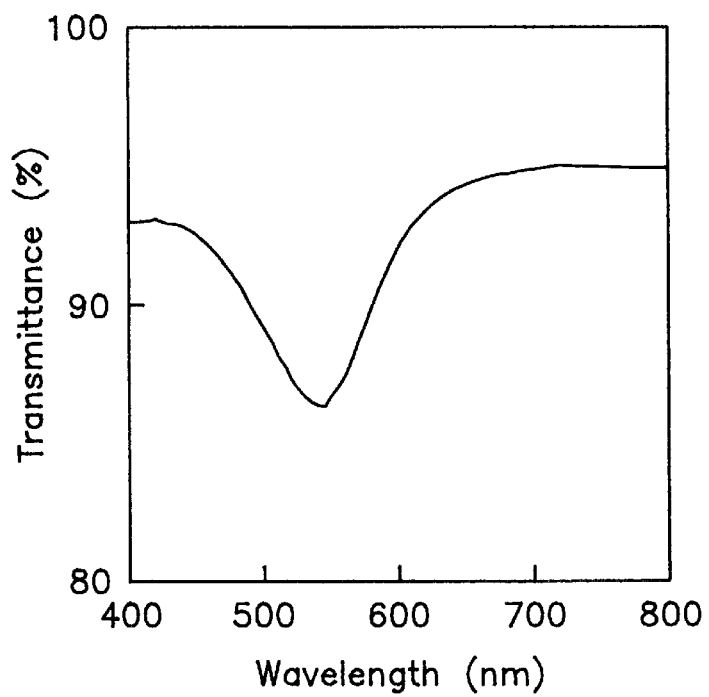
FIG. 2 shows the UV-visible reflection spectra of the film prepared in Example 2.

What is claimed is:

1. A moulded article comprising a polymer capable of forming a liquid crystalline phase, which has a selective reflection maximum with respect to circularly polarized light in a visible light region, and has an absolute value of the apparent circular dichroism by a selective reflection of not lower than 2,000 millidegree.

2. A moulded article as claimed in claim 1, wherein said polymer is a cellulose derivative.

3. A moulded article comprising a water-insoluble cellulose derivative, which has a reflection maximum in a wavelength range of not shorter than 300 nm, and selectively reflects substantially right- or left-circularly polarized light.

4. A moulded article as claimed in claim 2 or 3, wherein said cellulose derivative comprises cellulose ether or its derivative.

5. A moulded article as claimed in claim 2 or 3, wherein said cellulose derivative comprises ethyl cellulose or its derivative.

6. A moulded article as claimed in claim 3, wherein an absolute value of the apparent circular dichroism by the selective reflection is not less than 2,000 millidegree.

7. A process for producing the selectively reflective moulded article of claim 1, which comprises the step of forming a liquid crystalline phase by contacting a moulded article which is composed of a polymer capable of forming the liquid crystalline phase, with a vapour of a solvent, and the step of removing the solvent.

8. A process for producing a selectively reflective moulded article as claimed in claim 7, wherein the moulded article which is composed of the polymer capable of forming the liquid crystalline phase is formed on a base by coating a solution containing the polymer and the solvent.

9. A process for producing a selectively reflective moulded article as claimed in claim 7, which comprises the step of forming a liquid crystalline phase by contacting a thin film-like moulded article which is composed of the polymer capable of forming the liquid crystalline phase, with a vapour of the solvent, and the step of removing the solvent.

10. A method of producing a selectively reflective moulded article as claimed in claim 9, which comprises the step of exposing a thin film-like moulded article composed of the polymer to a volatile atmosphere of a solvent for said polymer to equilibrate the vapour pressure of the solvent in the moulded article with that in the atmosphere, and the step of removing the solvent, in order to obtain the film-like moulded article which selectively reflects substantially right- or left-circularly polarized light.

11. A process as claimed in claim 7, wherein said polymer which can form the liquid crystalline phase is a cellulose derivative.

12. A process as claimed in claim 7, wherein said solvent is an organic solvent with a boiling point of not higher than 100° C.

13. A moulded article as claimed in claim 2, wherein an average degree of substitution of said cellulose derivative is about 1 to 3.

14. A moulded article as claimed in claim 1, wherein said polymer is at least one cellulose ether selected from the group consisting of an alkyl cellulose, an aralkyl cellulose, a hydroxyalkyl cellulose, a carboxyalkyl cellulose, a hydroxyalkyl alkyl cellulose and a cyanoalkyl cellulose; or a cellulose ether ester resulting from the esterification of the cellulose ether with a $C_{2-5}$ organic acid; or a cellulose ester, or cellulose triphenylcarbamate.

15. A moulded article as claimed in claim 14, wherein the alkyl cellulose is selected from the group consisting of methyl cellulose and ethyl cellulose.

16. A moulded article as claimed in claim 14, wherein the aralkyl cellulose is selected from the group consisting of benzyl cellulose, phenetyl cellulose and trityl cellulose.

17. A moulded article as claimed in claim 14, wherein the hydroxyalkyl cellulose is selected from the group consisting of hydroxyethyl cellulose and hydroxypropyl cellulose.

18. A moulded article as claimed in claim 14, wherein the carboxyalkyl cellulose is carboxymethyl cellulose.

19. A moulded article as claimed in claim 14, wherein the hydroxyalkyl alkyl cellulose is selected from the group consisting of hydroxyethyl methyl cellulose, hydroxyethyl ethyl cellulose, hydroxypropyl methyl cellulose, and hydroxypropyl ethyl cellulose.

20. A moulded article as claimed in claim 14, wherein the cyanoalkyl cellulose is cyanoethyl cellulose.

* * * * *

UNITED STATES PATENT AND TRADEMARK OFFICE
CERTIFICATE OF CORRECTION

PATENT NO. : 6,007,738
DATED : December 28, 1999
INVENTOR(S) : Shimamoto et al.

It is certified that error appears in the above-identified patent and that said Letters Patent is hereby corrected as shown below:

Title page,
Item "[73] Assignee:", the second assignee is missing. Please insert the second assignee under item "[73]" as follows: -- Pulp and Paper Research Institute of Canada, Quebec, Canada --.

Signed and Sealed this

Twenty-first Day of August, 2001

Attest:

*Nicholas P. Godici*

NICHOLAS P. GODICI
*Attesting Officer*  *Acting Director of the United States Patent and Trademark Office*